(12) United States Patent
Kasper (10) Patent No.: US 11,125,260 B1
(45) Date of Patent: Sep. 21, 2021

(54) DOWEL AND JOINT CONSTRUCTION METHOD FOR WOODEN FURNITURE

(71) Applicant: Erica Felecia Kasper, Arlington, TX (US)

(72) Inventor: Erica Felecia Kasper, Arlington, TX (US)

( * ) Notice: Subject to any disclaimer, the term of this patent is extended or adjusted under 35 U.S.C. 154(b) by 0 days.

(21) Appl. No.: 17/207,701

(22) Filed: Mar. 21, 2021

(51) Int. Cl.
*F16B 12/24* (2006.01)
*A47B 83/04* (2006.01)
*A01K 1/03* (2006.01)

(52) U.S. Cl.
CPC .............. *F16B 12/24* (2013.01); *A47B 83/04* (2013.01); *A01K 1/03* (2013.01); *A47B 2230/0037* (2013.01)

(58) Field of Classification Search
CPC .. F16B 12/46; F16B 12/24; A47B 2230/0037; A47B 83/04; A01K 1/03
See application file for complete search history.

(56) References Cited

U.S. PATENT DOCUMENTS

| | | | | | |
|---|---|---|---|---|---|
| 1,354,549 | A | * | 10/1920 | Gilmer | F16B 12/24 403/280 |
| 4,067,165 | A | * | 1/1978 | Timmons | E04B 2/7425 52/238.1 |
| 4,093,389 | A | * | 6/1978 | Wibrow | F16B 19/00 403/280 |
| 4,616,757 | A | * | 10/1986 | Hobson | B27B 17/0041 211/189 |
| 5,385,247 | A | * | 1/1995 | Owens | E04H 1/1205 211/49.1 |
| 5,803,561 | A | * | 9/1998 | Puehlhorn | F16B 12/125 312/263 |
| 6,126,022 | A | * | 10/2000 | Merkel | A47B 47/042 108/180 |
| RE38,707 | E | * | 3/2005 | Merkel | A47B 47/042 108/180 |
| 7,124,695 | B2 | * | 10/2006 | Buechler | A47B 45/00 108/180 |
| 7,467,721 | B2 | * | 12/2008 | Choi | A47B 47/00 211/189 |

* cited by examiner

*Primary Examiner* — Basil S Katcheves
*Assistant Examiner* — Omar F Hijaz (57) ABSTRACT

The invention is a dowel and joint system for wooden construction and wood joinery. It Provides and easy method to assemble wood furniture making it both easy and light weight. Wood is naturally heavy, by using a method to join pieces of wood that is both simple and light weighted, this method provides a stable structure that is earth friendly (uses less wood) and lightweight. It makes it easy for users to assemble and disassemble real wood or wood imitation furniture.

3 Claims, 16 Drawing Sheets

DOWEL AND JOINT CONSTRUCTION METHOD FOR WOODEN FURNITURE

FIELD OF INVENTION

The present invention relates to furniture joinery and more particularly to a dowel and joint system which comprises of dowel pins and panels for construction of wooden furniture and joining furniture components.

BACKGROUND OF INVENTION the use of dowel joint as a part of woodworking is not new to society. It involves joining together pieces of wood or lumber, to produce more complex items. Some wood joints employ fasteners, bindings, or adhesives, while others use only wood elements. The characteristics of wooden joints are its strength, flexibility, toughness and appearance. From the properties of the materials involved and the purpose of the joint, different joinery techniques are used to meet differing requirements. A dowel is a cylindrical rod, usually made from wood, plastic, or metal. In its original manufactured form, a dowel is called a dowel rod. Dowel rods are often cut into short lengths called dowel pins. The end of a piece of wood is butted against another piece of wood. This is reinforced with dowel pins. This joint is quick to make with production line machinery and so it is a very common joint in factory-made furniture.

Dowels are commonly used as structural reinforcements in cabinet making and in numerous other applications which includes Furniture shelf supports, Moveable game pieces (i.e. pegs), Hangers for items such as clothing, work table stations, key rings, and Wheel axles in toys. Prior art joinery, sometimes utilizes dovetail construction which has various deficiencies. First, the dovetails are difficult to manufacture which results in higher costs being passed to the consumer, The dovetail design also has a weakened area where the dovetail extends from the work piece, Such area is typically referred to as a neck and receives the majority of the stress created at the joint and dovetail can be fairly difficult to mark out and cut, and if they are made badly these joints lose the advantages listed above. While majority of the dowel joint available in the market for purchase comes with a huge disadvantage of being too hard to assemble for a beginner, the present invention seeks to curb this disadvantages.

DESCRIPTION OF PRIOR ARTS

U.S. Pat. No. 6,991,397B2 This invention is an improved dowel fastener for compressive insertion within a recess, bore or aperture in each of two joint members of wood, metal, plastic or combinations thereof to frictionally retain one joint member to the other. The dowel fastener includes a flexible, resilient, tubular body having a preferably spiral slot extending from end to end and at least one and preferably two spaced tabs at positions along the slot. The tabs each extend from one slot edge across the slot toward the opposing slot edge and engage the inside surface of the tubular body adjacent the opposing slot edge. The body provides a cylindrical exterior gripping surface for engagement with the sides of the joint apertures and is sufficiently flexible for compression from its normal, uncompressed diameter for insertion in a smaller fastening aperture. The resiliency of the tubular body and the engagement of the tabs with the inside surface of the body resist compression for secure frictional engagement by the body exterior with the sides of the fastening apertures.

DE2015201A1 This invention is a dowel having a closely ribbed center section with annular ribs at each end that have rib peaks slightly larger in diameter than the longitudinal ribs of the Centre portion, a bore runs the whole length of the dowel. A releasable dowel can be formed by the entry in the drilling of a bell shaped tube at least the length of the end ribbed portion.

U.S. Pat. No. 8,092,112 This invention is a dowel assembly for a furniture system provides a fastener usable in assembling various components in a furniture system. The dowel may be employed to define the relationship between first and second components of the furniture system, such as the relationship between adjoining planar surfaces of adjacent furniture panels. The dowel is fitted with a cam such that the cam provides a non-uniform radius at the interface between the dowel and one of the components. Through selective positioning of the cam about the longitudinal axis of the dowel, the interface between components of the furniture system may be selectively adjusted to ensure a flush alignment of contiguous surfaces.

U.S. Pat. No. 569,235 This invention is a wooden dowel-pin having longitudinal ribs forming edges adapted to embed themselves in the wood into which the pin is driven, shallow grooves or creases between the ribs adapted to retain glue distributed around the pin approximately its entire length, and a longitudinal vent-groove of greater depth than the glue-retaining creases or grooves between the ribs or beads, substantially as and for the purposes set forth.

U.S. Pat. No. 3,527,486 This invention relates to a dowel sleeve for receiving a fastening pin for attaching cover strips, door facings, wall facings and the like. It is an object of the invention to provide a dowel sleeve which facilitates the assembly of such elements. Another object of the invention is to provide a dowel sleeve which can be used in all structural woodwork, in the manufacture of furniture, in built-in furniture of wood, in furniture combined with doors and walls, in wooden ceilings and in cupboard doors.

U.S. Pat. No. 7,677,830B1 This invention is a furniture joinery system comprising of a slide rail having a plurality of grooves, at least one slide block slid ably disposed in the slide rail, the slide block having a plurality of slides for engaging the slide rail, at least one of the plurality of slides having a neck and a head, the grooves receiving the neck therein.

The present invention aims to provide an effective solution to all the shortcomings associated with existing dowel joints and the aforementioned prior arts. This is made possible with the introduction of multiple dowel pins which varies in shapes and lengths having screw hole for screws to provide more stability and firmness. The invention further comprises of a plurality of panels consisting of the front panel, back panel, and two side panels which comprises of joint tabs and slots for fastening together and providing a rigid and stable furniture piece. The invention also eliminate the need for nails and staples, This not only removes the potential injuries that come with working with hardware but also can give your project a more finished look as there will be no nails interrupting the wood's grain pattern. Furthermore the invention provides more stability because the pin runs inside the wood, the joint is very strong, much stronger than using nails or glue to attach the wood. The invention also solves the problem of complexity and difficulty in assembling or usage, it Provides and easy method to assemble wood furniture that is both easy and light weight.

SUMMARY OF THE INVENTION

The following summary discloses all the features and functions of the present invention, by considering the whole specifications, claims, drawings and abstract, one can easily get a full understanding of the invention and how it functions.

The present invention is a dowel and joint system for wooden constructions and wood joinery. The invention discloses a dowel pin which is used to join the front and back panels by a single screw on each end of the dowel. Prior to attaching the dowels, the invention discloses a side panel which further comprises of a plurality of joint tabs on the edges, the joint tabs are keyed into the front panel which has a plurality of slot openings and screw holes. The invention further discloses a back panel with a plurality of slot openings and screw holes on the edges, which are also keyed into the various slot openings on the side panel giving a sturdy and rigid appearance. Once the joint tabs are securely affixed into each other, the dowels are completely screwed in, giving the furniture stability.

DETAILED DESCRIPTIONS OF DRAWINGS

Figure 1:
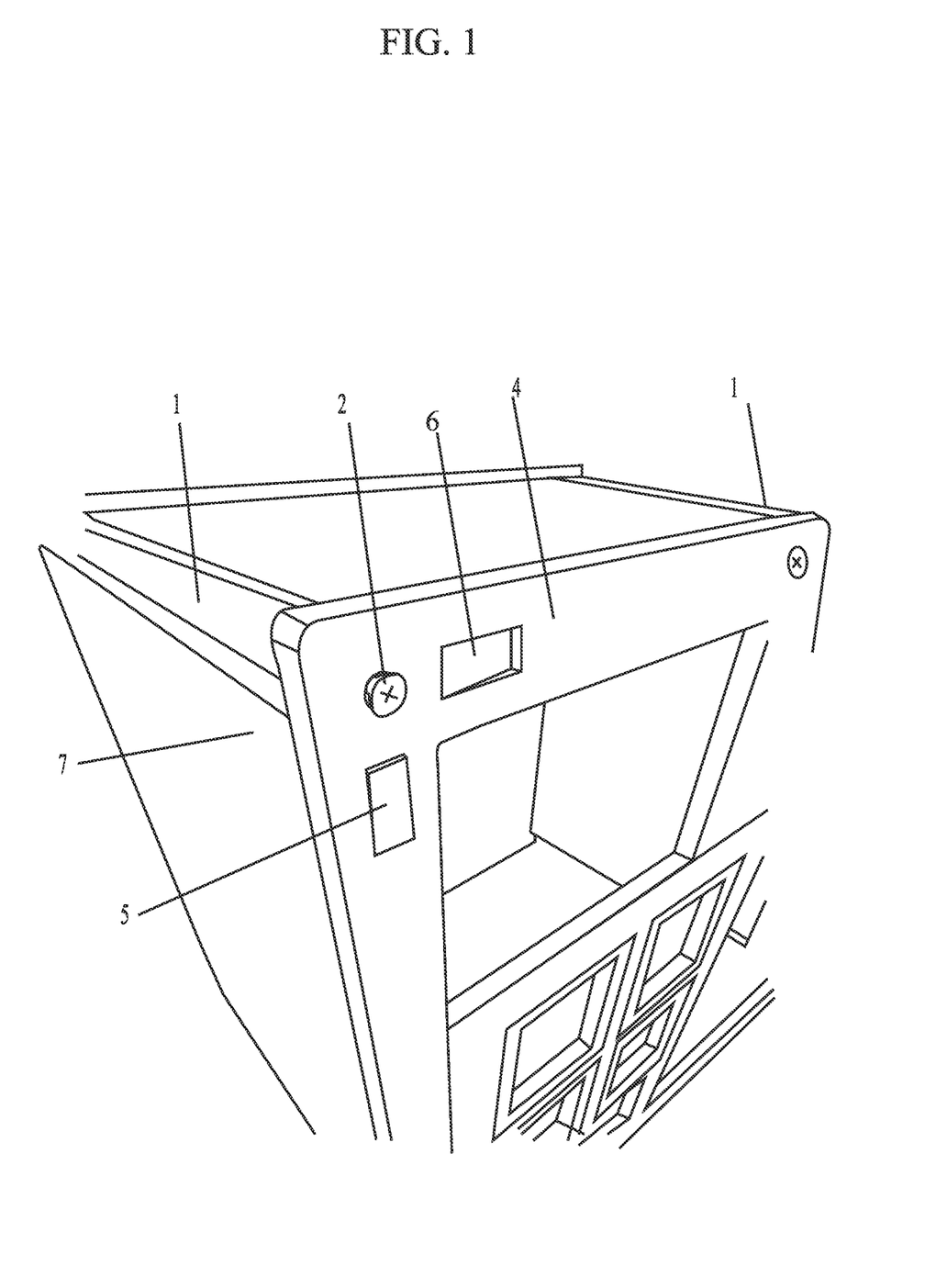
FIG. 1 the invention discloses the front side view of the invention.

In FIG. 1 the present invention discloses the front side view of the invention being used with a sofa end table with dog crate, which comprises of a dowel pin (1), with a screw hole into which the screw (2), is used to attach the front panel (4), to the back panel for maximum stability and firmness. The front panel (4), further comprises of the joint slot (6), into which the joint tab (5), on the side panel (7), is inserted, thus providing a sturdy and strong joint.

Figure 2:
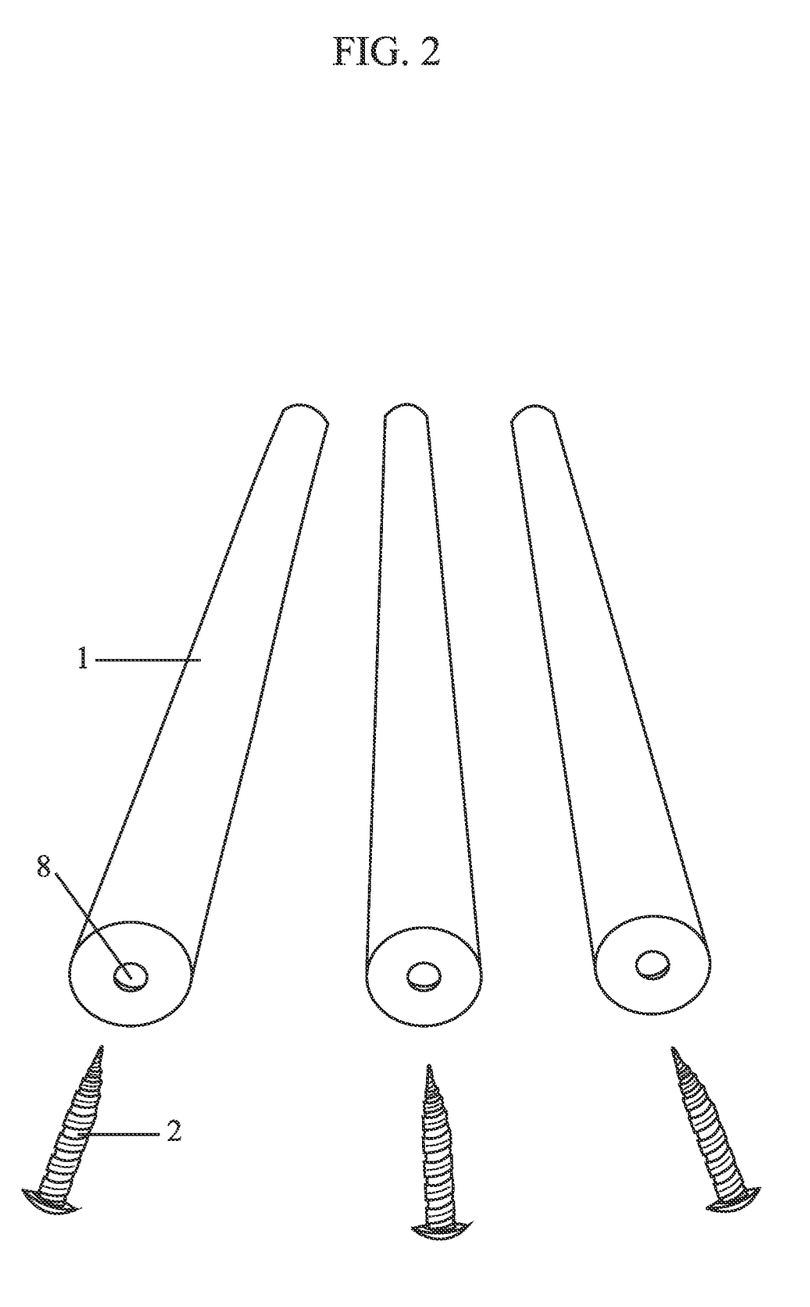
FIG. 2 discloses a side view of the dowel pins.

In FIG. 2, the invention discloses the dowel pins (1), which has a screw hole (8), drilled into it, this allows the screw (2), to be used further with the dowel to attach the front panel to the rear panel for a more durable joint construction and sturdy furniture.

Figure 3:
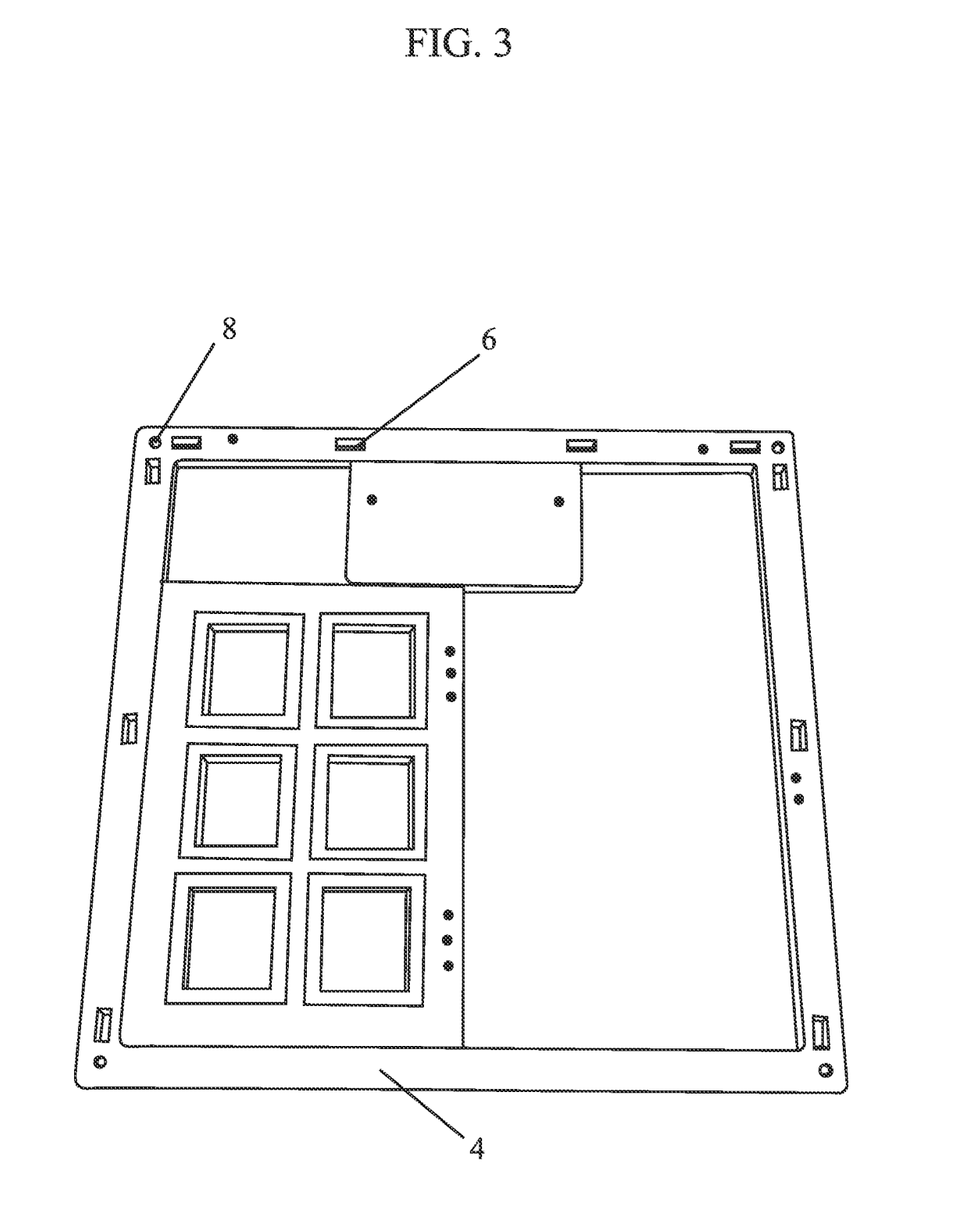
FIG. 3 discloses the side view of the front panel.

In FIG. 3, the invention discloses the front view of the front panel (4), which further comprises of the screw hole (8), into which the screw attaches the dowel pin to the rear panel. The front panel further comprises of the slot (6), which houses the joint tab that serves as a connector for the front panel and side panel, locking them in place and providing a strong and sturdy joint.

Figure 4:
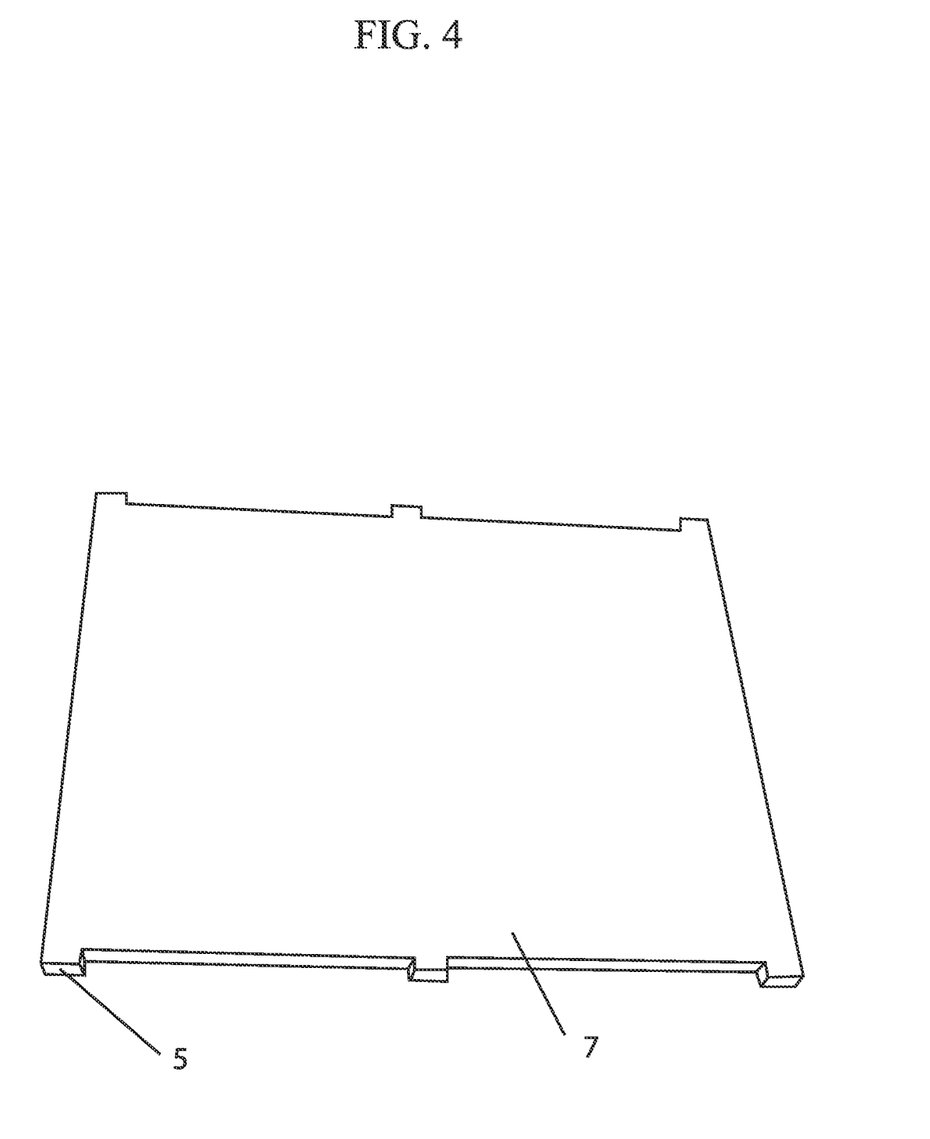
FIG. 4 discloses a side view of the side panel.

In FIG. 4, the invention discloses the side panel (7), which has a plurality of joint tabs (5), at the various edges. The joint tabs are used to attach the side panel to the front and rear panels through the slot holes. This provides extra support and keeps the panels locked in place, preventing rickety or unsteady joints.

Figure 5:
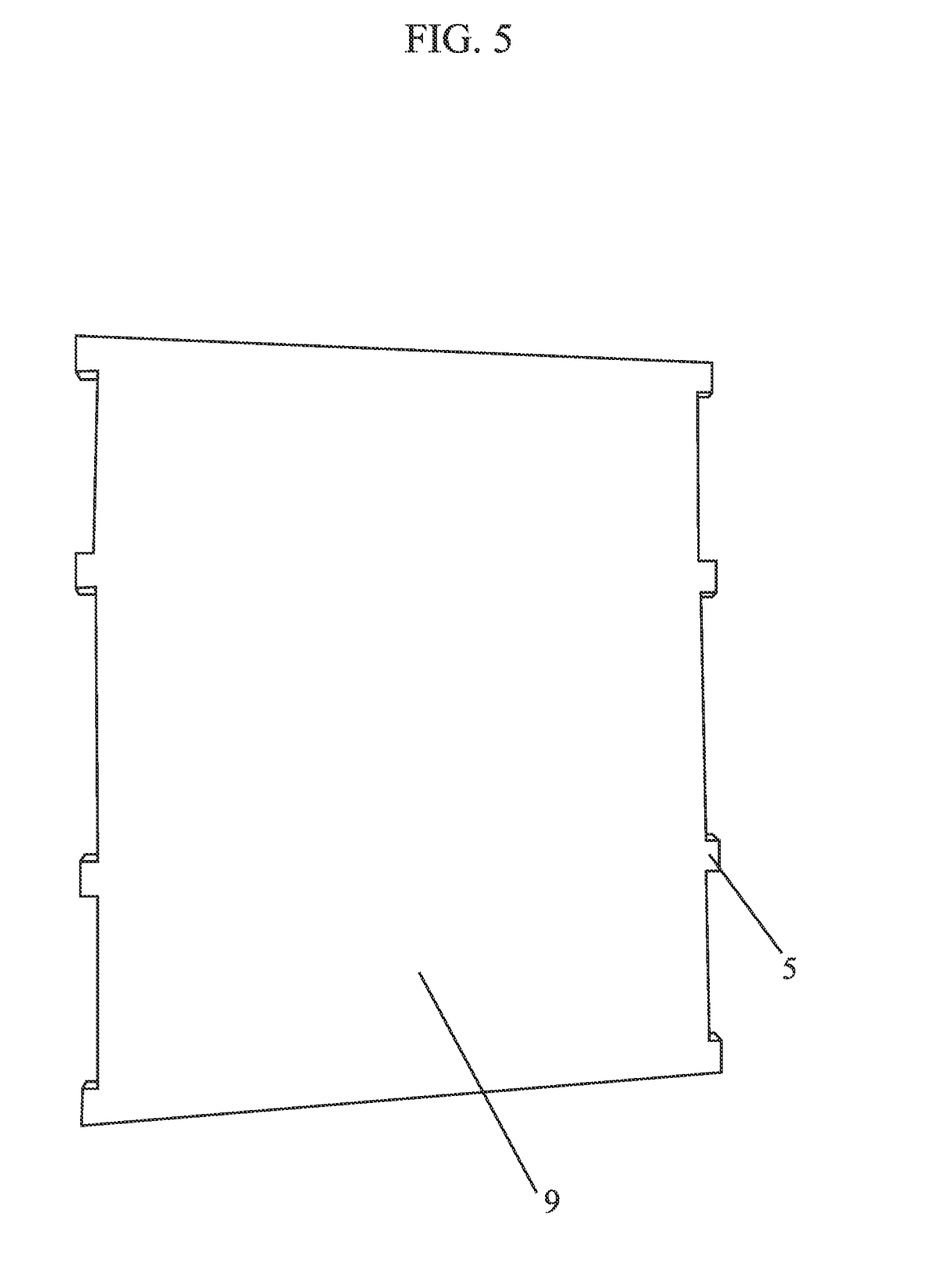
FIG. 5 discloses a side view of the top panel.

In FIG. 5, the invention discloses the top panel 9 which has a plurality of joint tabs (5), at the various edges, the joint tabs are used to attach the top panel to the front and rear panel slots.

Figure 6:
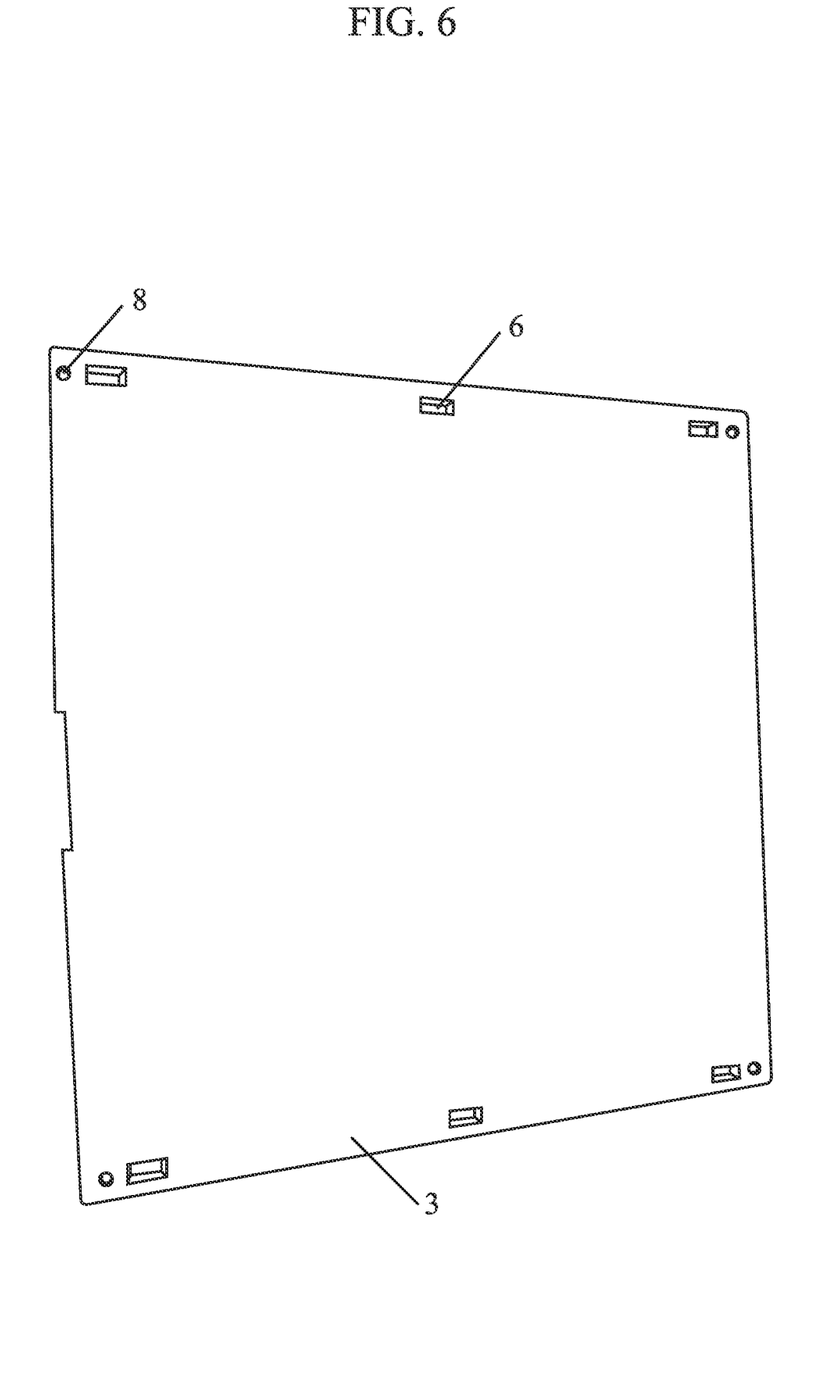
FIG. 6 discloses a side view of the rear/back panels.

In FIG. 6, the invention discloses the rear/back panel (3), which further comprises of a plurality of joint slots (6), and a plurality of screw holes. The joint slot are used to attach the rear panel to the side panels, and the screw holes are used to attach the front panel to the back panel using the dowel pin.

Figure 7:
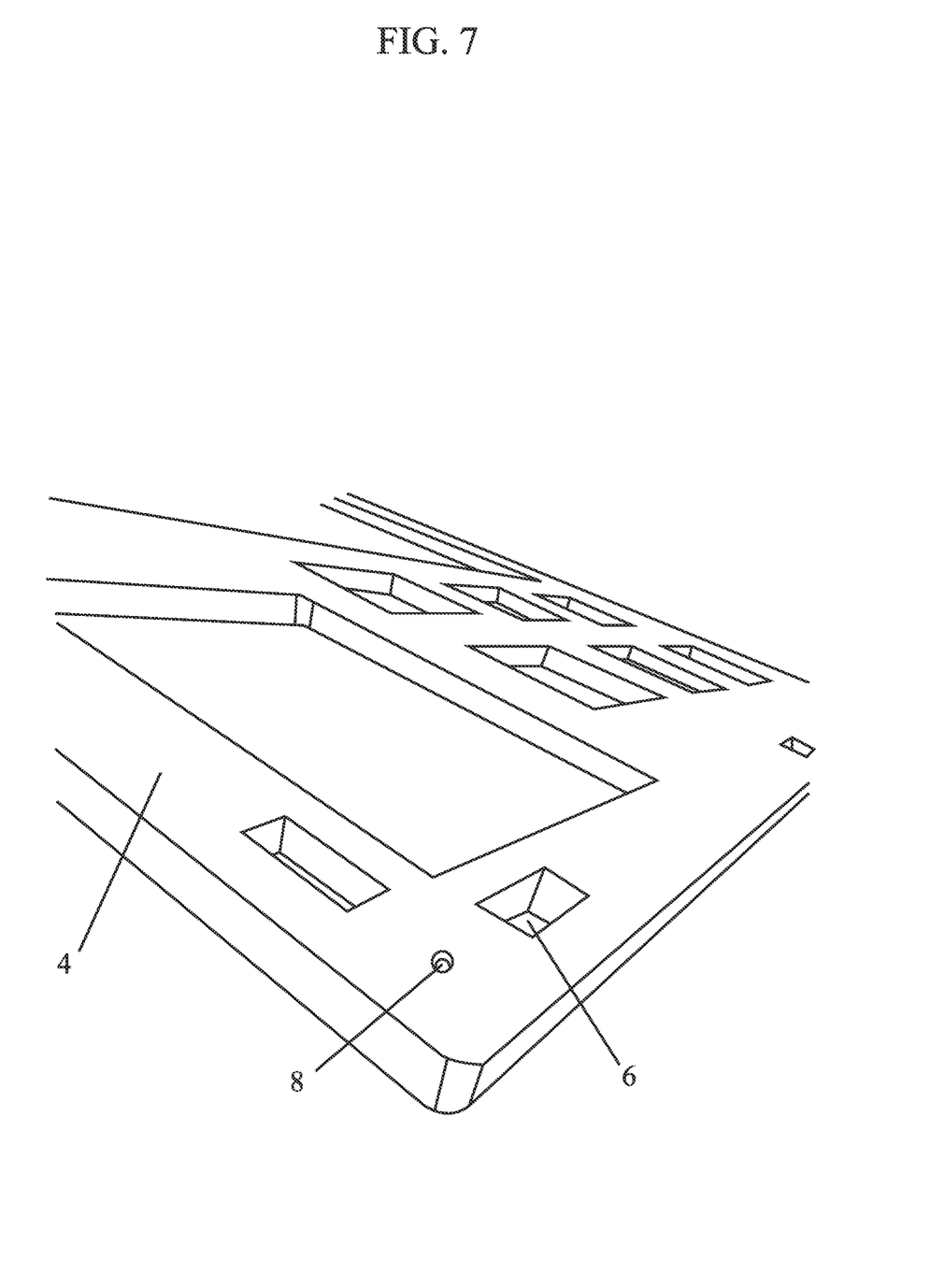
FIG. 7 discloses a close up view of the front panels.

In FIG. 7, the invention discloses a close up view of the front panel (4), displaying the slot (6), and the screw holes (8).

Figure 8:
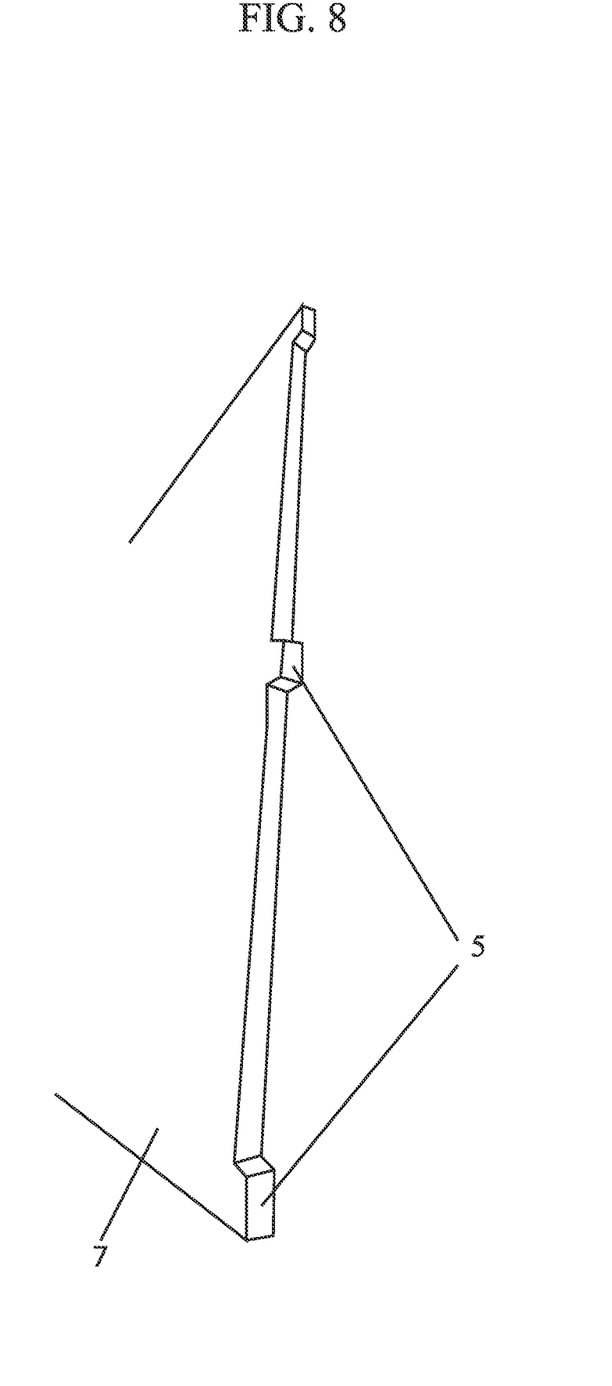
FIG. 8 discloses a side view of the side panel.

In FIG. 8, the invention discloses a close up view of the side panel (7), displaying the joint tabs (5).

Figure 9:
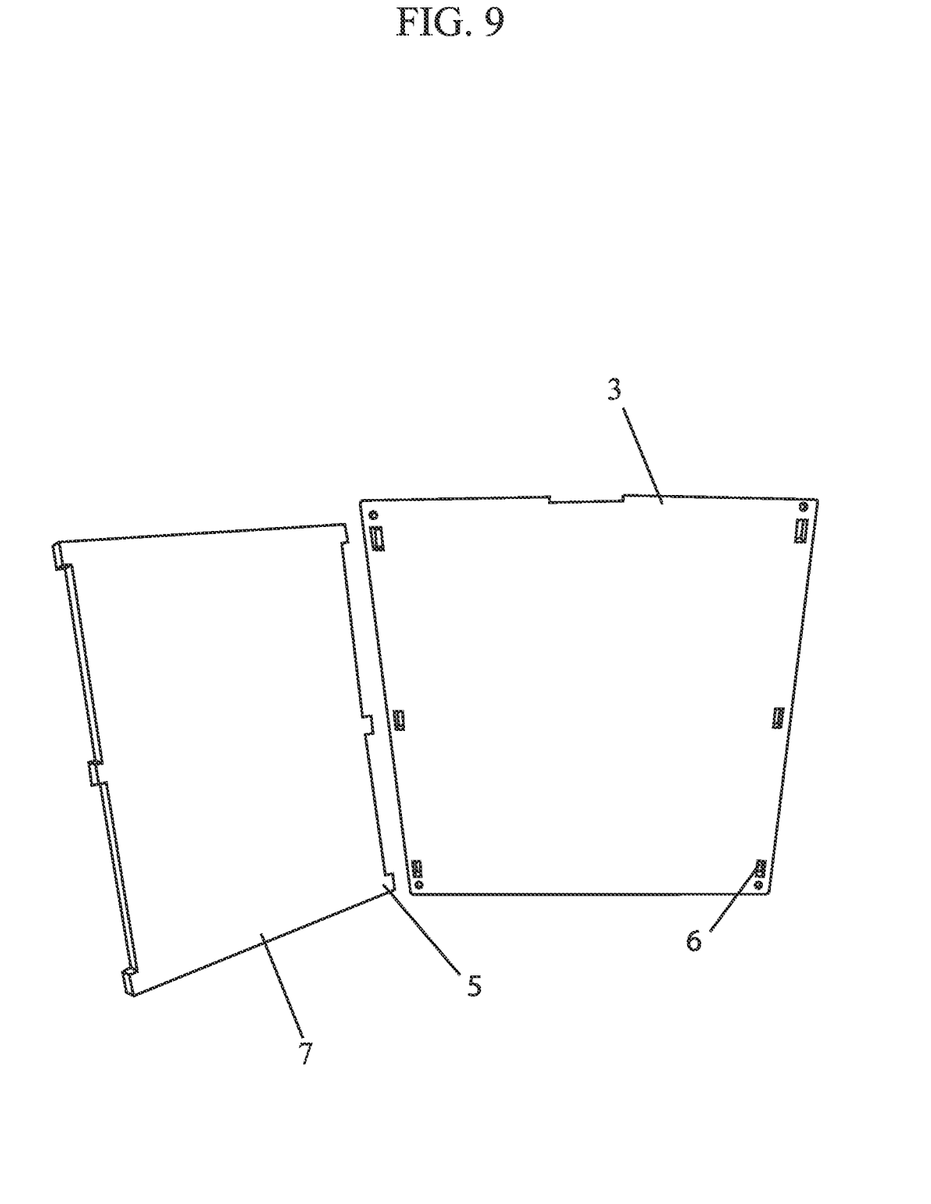
FIG. 9 discloses a set up view of the side panel and back panel.

In FIG. 9, the invention discloses a set up view of the side panel (7), with the joint tab (5), going into the slot (6), on the rear or back panel (3).

Figure 10:
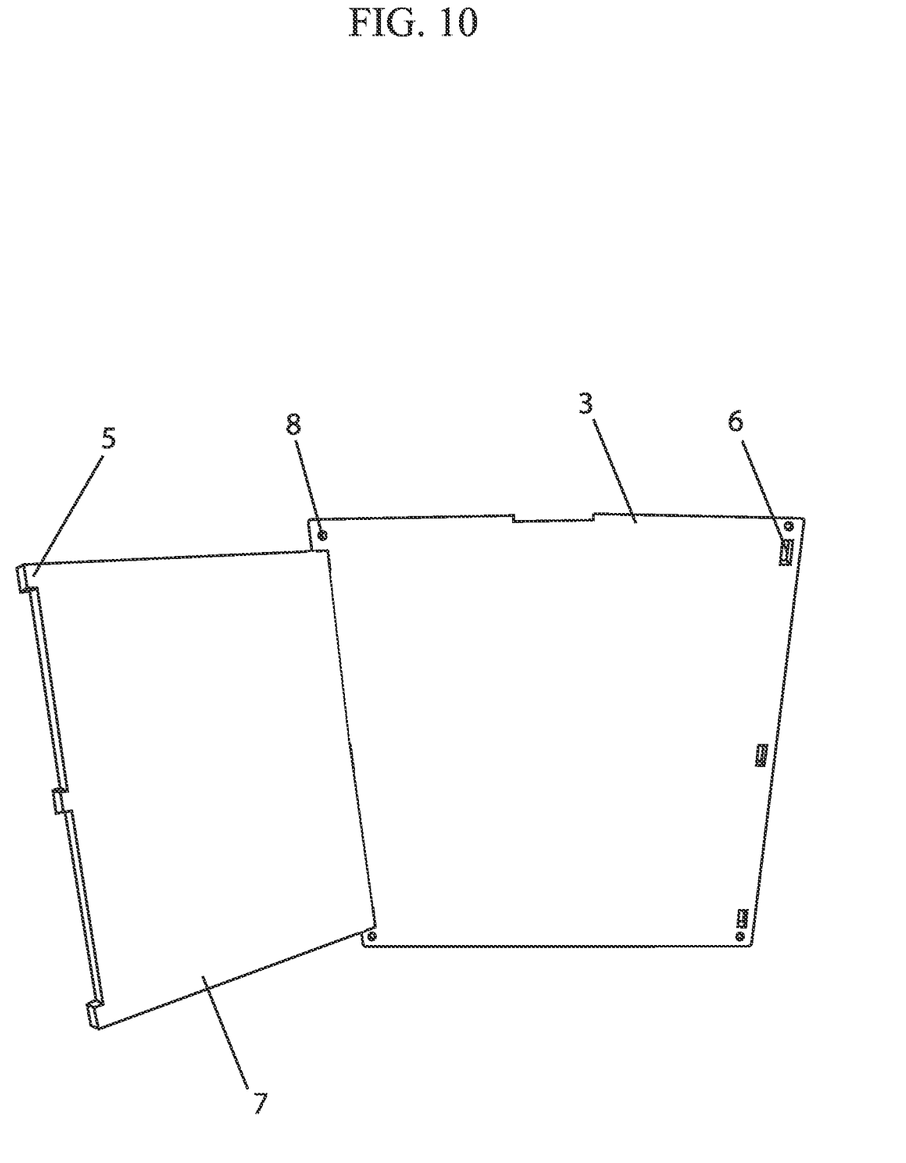
FIG. 10 discloses a set up view of the side panel and back panel.

In FIG. 10, the invention discloses an assembled view of the side panel (7), with the joint tab (5), attached to the slot hole (6), on the back panel (3). The pack panel also discloses the screw hole (8), into which the screw attaches the front panel to the back panel using the dowel pins.

Figure 11:
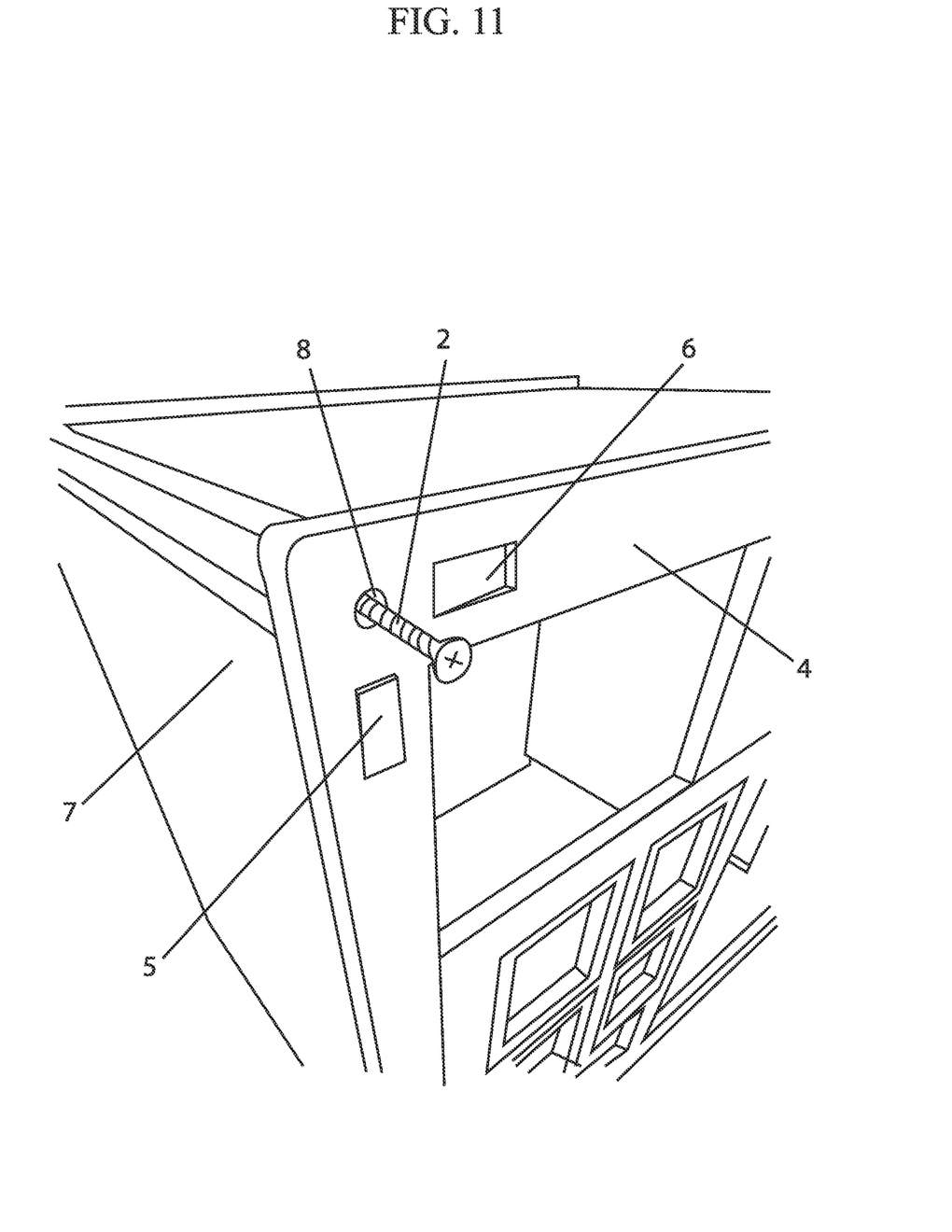
FIG. 11 discloses a front side view of the furniture piece.

In FIG. 11, the invention discloses the side panel (7), attached to the front panel (4), using the joint tabs (5), the front panel discloses the slot (6), the screw (2), and the screw hole (8), without the dowel attached.

Figure 12:
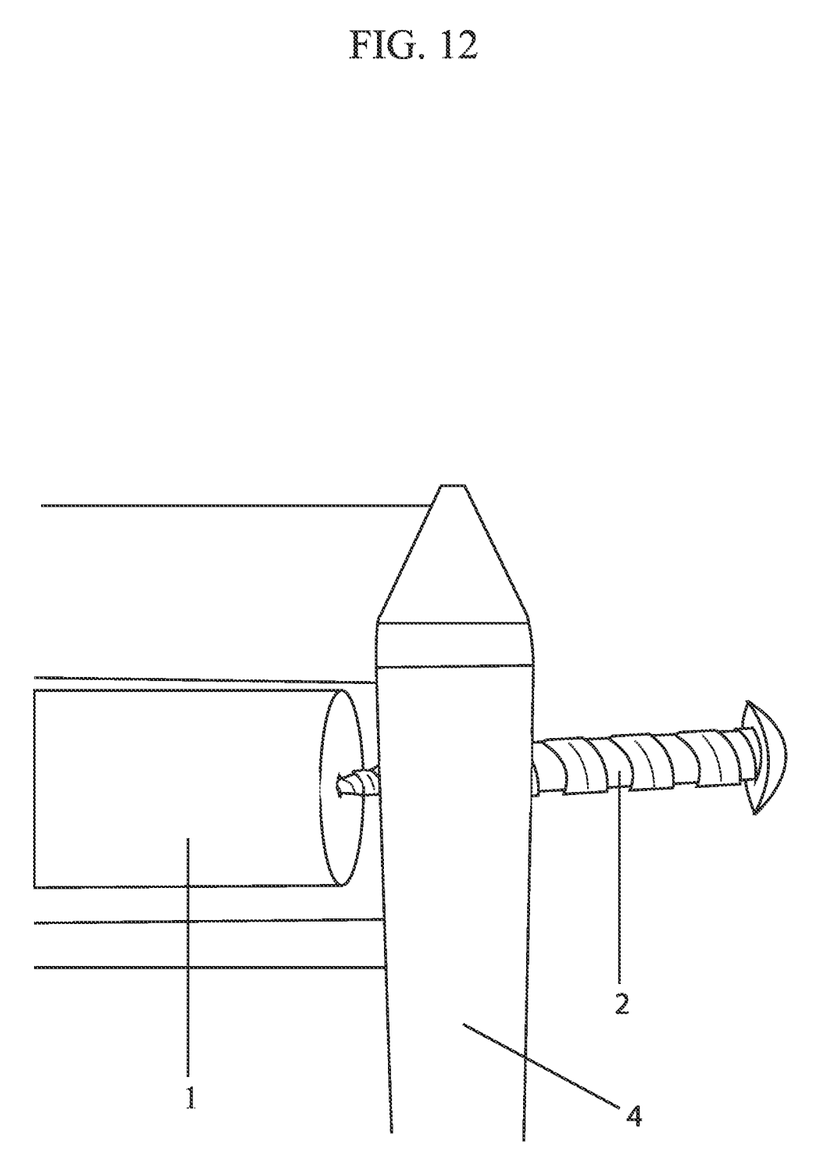
FIG. 12 discloses a side view of the dowel and front panel.

In FIG. 12, the invention discloses the screw (2), being screwed through the front panel (4), into the dowel pins (1).

Figure 13:
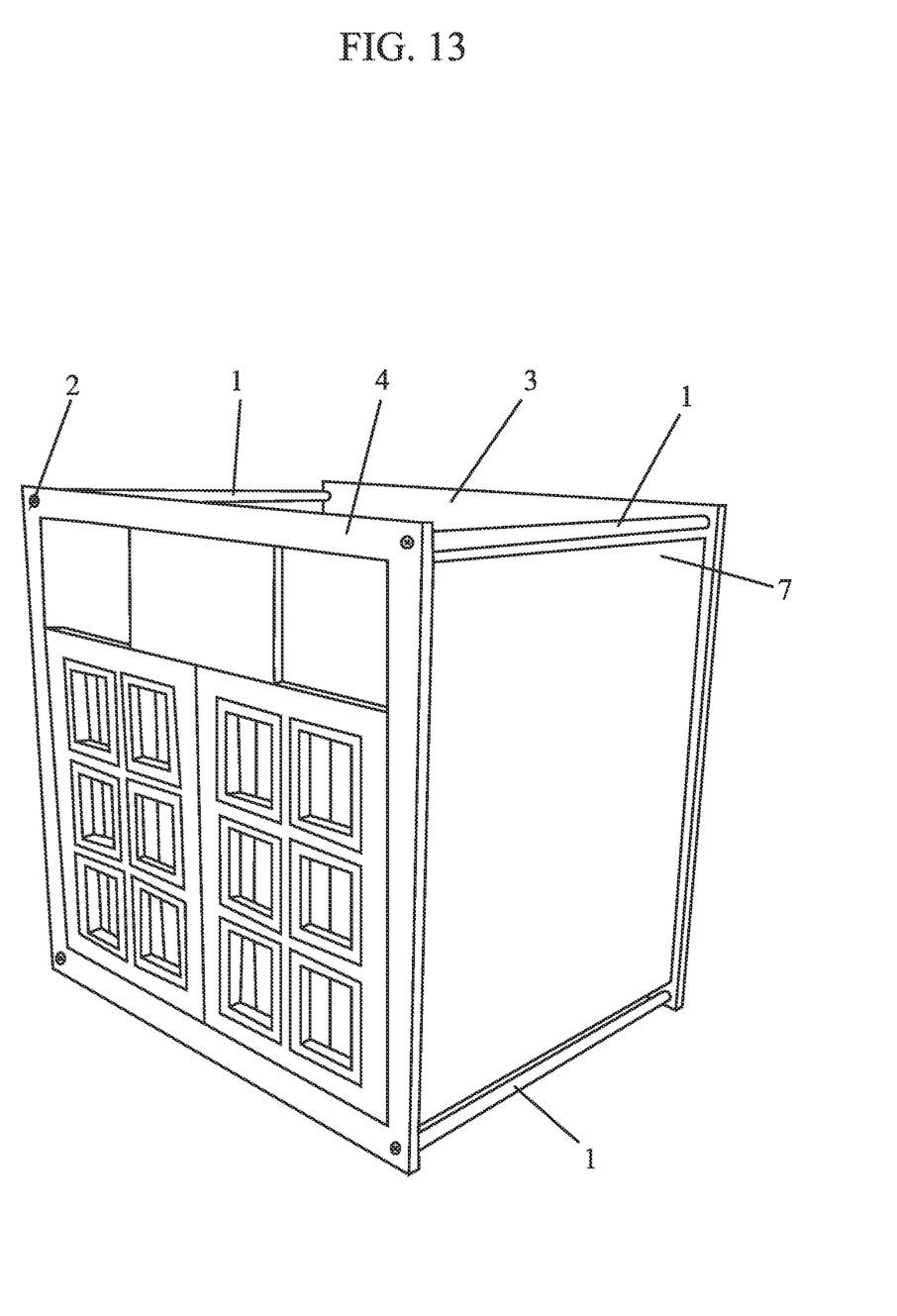
FIG. 13 discloses a front side view of the furniture piece.

In FIG. 13, the invention discloses a partially exploded perspective view of a sofa end table with dog crate as in FIGS. 1 and 11 utilizing the dowel and joint system. The invention discloses the use of four dowels. The furniture piece comprises of the dowel (1), side panel (7), rear panel (3), and the screws (2).

Figure 14:
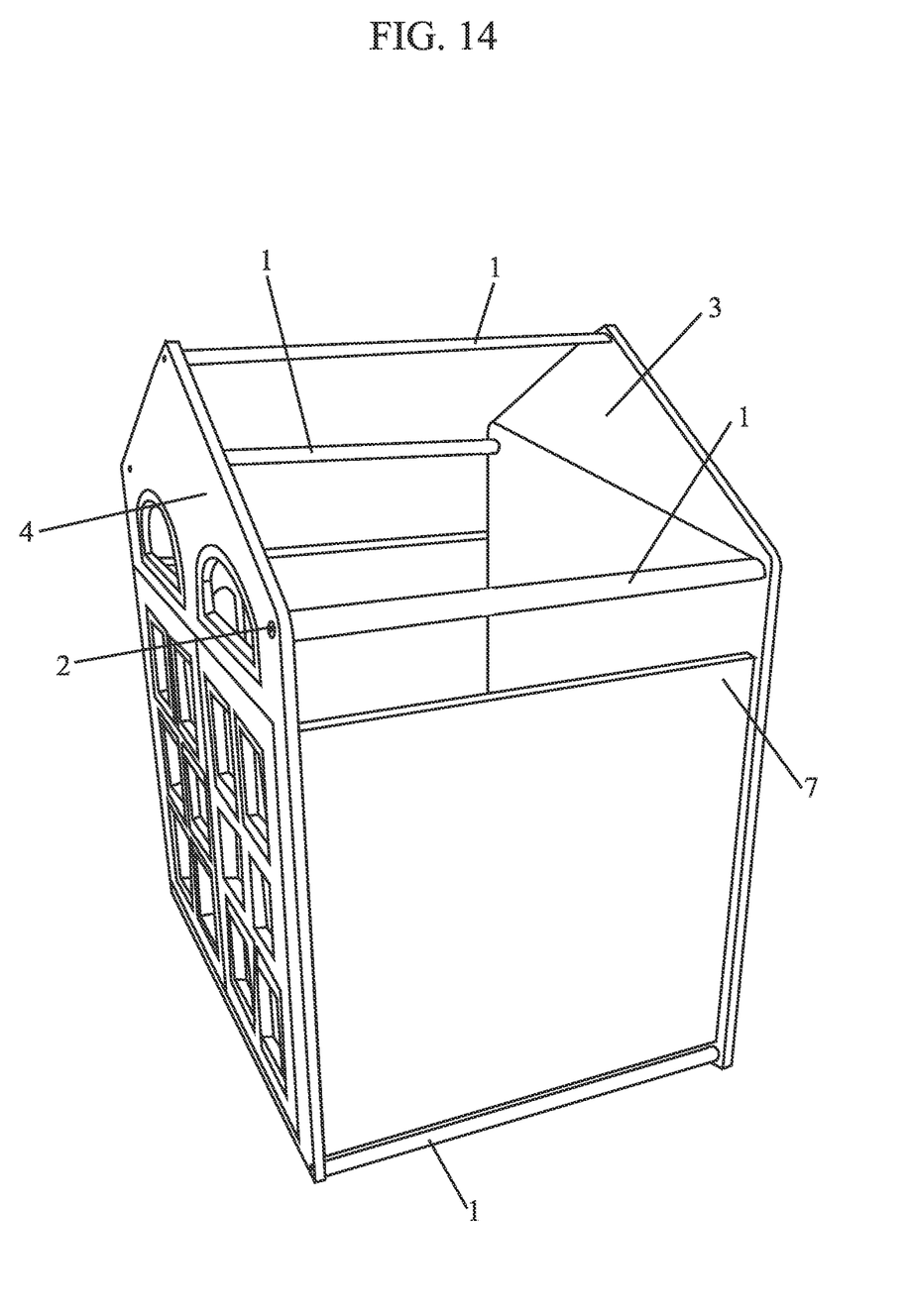
FIG. 14 discloses a side view of the furniture piece.

In FIG. 14, the invention discloses a partially exploded perspective view of dog crate furniture utilizing the dowel and joint system. A total number of five dowels is used. The dowel pin (1), front panel (4), side panel (7), rear panel (3), and screws (2), is disclosed.

Figure 15:
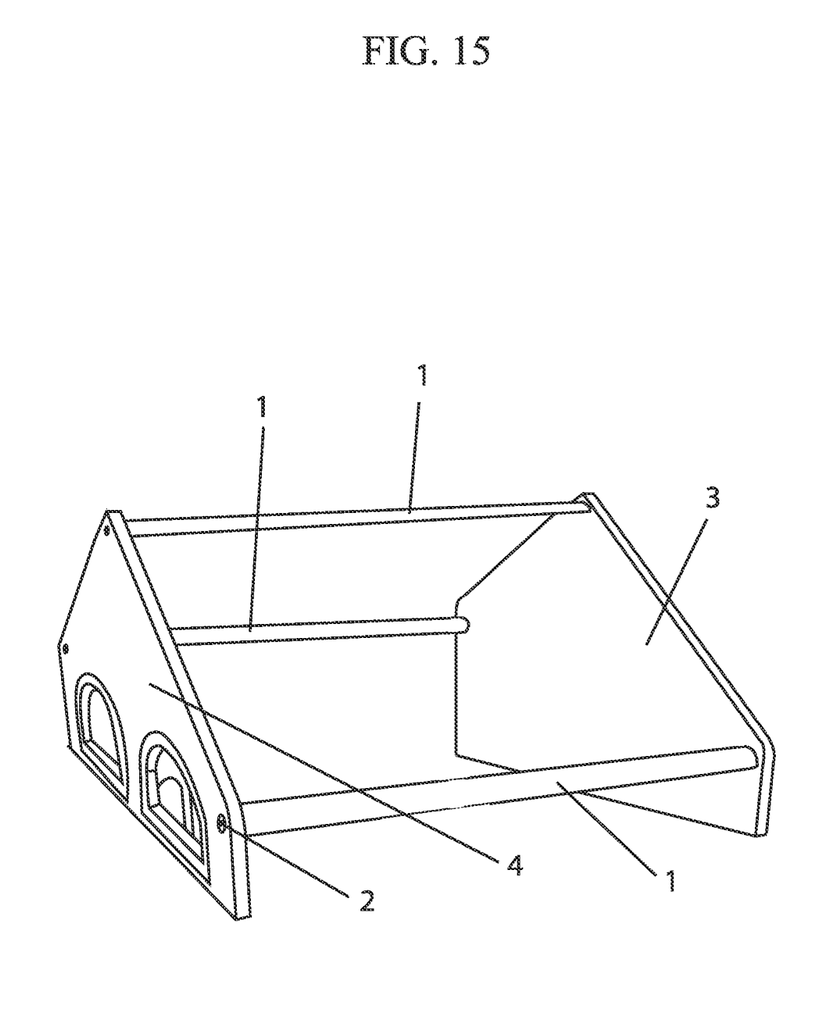
FIG. 15 discloses the top view of the furniture piece.

In FIG. 15, the invention discloses a partially exploded perspective of the top view of a dog crate furniture utilizing the dowel and joint system. A total number of three dowels is displayed. The invention discloses a dowel (1), front panel (4), screw (2), and back panel (3).

Figure 16:
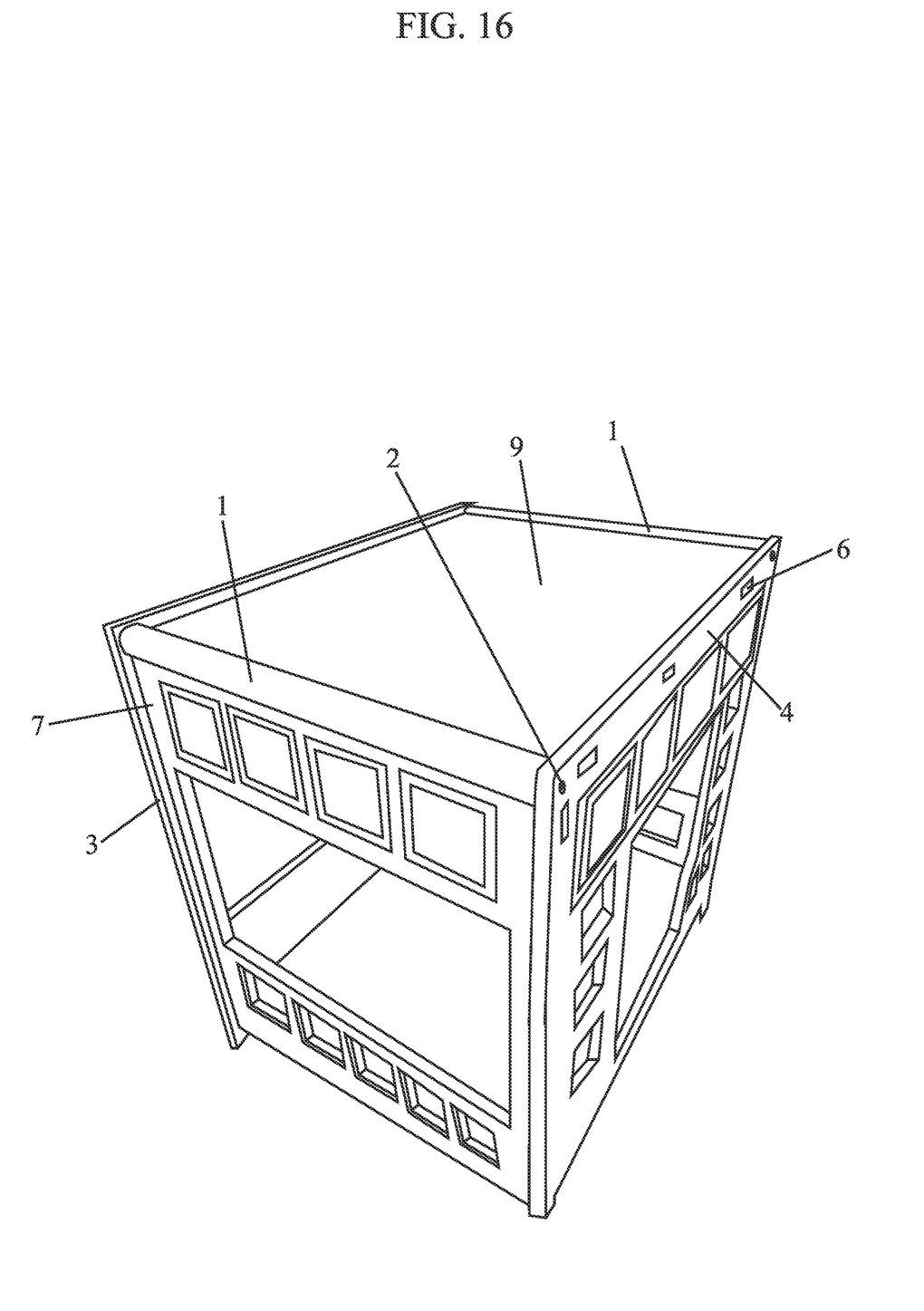
FIG. 16 discloses the top side view of the furniture piece.

In FIG. 16, the invention discloses a partially exploded perspective view of a night stand with dog bed at the bottom, utilizing the dowel and joint system. It discloses the dowel pins (1), screws (2), rear panel (3), front panel (4), slot (6), side panel (7), and the top panel (9). In this furniture piece, two dowels were used.

HOW THE INVENTION IS USED

The invention is easy to assemble and dismantle as it is made of light wood which provides an easy method to assembling wood furniture making it both easy and light weighted. Wood is naturally heavy. By using a method to join pieces of wood that is both simple and lightweight, this method provides a stable structure that is earth friendly (uses less wood), light weighted and easy to assemble. These Makes it easy to assemble and disassemble real wood or imitation wood furniture by any user.

The dowels are joined to the front and rear panels by a single screw on each end of the dowel. Prior to attaching the dowels, the two side panels are then attached to the rear and front panels by inserting the joint tabs into the slot openings on each sides. Once the dowels are completely screwed in, it gives the piece of furniture stability.

The invention claimed is:
1. A dowel and joint apparatus comprising:
   i. a front panel member, having a first plurality of slot openings and a first plurality screw holes;
   ii. a back panel member, having a second plurality of slot openings and a second plurality of screw holes, removably secured to said front panel member;
   iii. a plurality of side panel members having a plurality of joint tabs removably secured to said first and second plurality of slot openings of said front panel member and said back panel member; and
   iv. a plurality of exposed and elongated dowel pin members each removably secured to and between opposing corners of said front panel member and said back panel member by screws, a single one of said screws fastened to each end of each of said dowel pin members through at least one of said first and second plurality of screw holes, and wherein each of said plurality of side panel members is vertically aligned with and spaced apart from at least one of said dowel pin members.
2. The dowel and joint apparatus of claim 1, comprising: a top panel member having a plurality of joint tabs which attach said top panel member to said front panel member and to said back panel member.
3. The dowel and joint apparatus of claim 1, comprising: a pre-drilled screw hole at each said end of said dowel pin members for receiving said screws, to attach said front panel member to said back panel member.

* * * * *